United States Patent
Li et al.

(10) Patent No.: US 9,141,609 B2
(45) Date of Patent: Sep. 22, 2015

(54) REDUCING SEQUENCE CACHE LATCH CONTENTION IN A DATABASE SYSTEM

(75) Inventors: Fulu Li, Foster City, CA (US); Vineet Marwah, San Ramon, CA (US); Amit Ganesh, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 693 days.

(21) Appl. No.: 13/309,394

(22) Filed: Dec. 1, 2011

(65) Prior Publication Data

US 2013/0145103 A1  Jun. 6, 2013

(51) Int. Cl.
*G06F 17/30* (2006.01)

(52) U.S. Cl.
CPC .................................. *G06F 17/30* (2013.01)

(58) Field of Classification Search
CPC ............................................. G06F 17/30445
USPC ......................................................... 707/720
See application file for complete search history.

(56) References Cited

U.S. PATENT DOCUMENTS

| | | | |
|---|---|---|---|
| 5,784,623 A * | 7/1998 | Srinivasan | 710/200 |
| 7,089,356 B1 * | 8/2006 | Chen et al. | 711/113 |
| 7,103,597 B2 | 9/2006 | McGoveran | |
| 7,136,967 B2 | 11/2006 | Sawdey | |
| 8,068,114 B2 | 11/2011 | Andre et al. | |
| 8,117,392 B2 | 2/2012 | Charney et al. | |
| 8,626,709 B2 * | 1/2014 | Isaacson et al. | 707/613 |
| 2005/0100017 A1 | 5/2005 | Williams et al. | |
| 2005/0220112 A1 | 10/2005 | Williams et al. | |
| 2006/0101207 A1 * | 5/2006 | Nakazato | 711/131 |
| 2006/0117212 A1 | 6/2006 | Meyer et al. | |
| 2006/0190453 A1 | 8/2006 | Colrain et al. | |
| 2007/0143766 A1 | 6/2007 | Farchi et al. | |
| 2008/0201523 A1 | 8/2008 | Ash et al. | |
| 2008/0244307 A1 | 10/2008 | Dasari et al. | |
| 2010/0082540 A1 | 4/2010 | Isaacson et al. | |
| 2010/0198920 A1 | 8/2010 | Wong et al. | |
| 2010/0250856 A1 | 9/2010 | Owen et al. | |
| 2011/0019550 A1 | 1/2011 | Bryers et al. | |
| 2011/0285731 A1 | 11/2011 | Andre et al. | |
| 2011/0289263 A1 | 11/2011 | McWilliams et al. | |

(Continued)

OTHER PUBLICATIONS

Non-final Office Action dated Oct. 25, 2013 for U.S. Appl. No. 13/309,300.

(Continued)

*Primary Examiner* — Rehana Perveen
*Assistant Examiner* — Hicham Skhoun
(74) *Attorney, Agent, or Firm* — Vista IP Law Group, LLP

(57) ABSTRACT

In a database system having a plurality of concurrently executing session processes, the method commences by establishing a master list of sequences, the master list comprising a plurality of sequence objects which in turn define a sequence of values used for numbering and other identification within the database system. To reduce sequence cache latch access contention, multiple tiers of latches are provided. Methods of the system provide a first tier having a first tier "global" latch to serialize access to the master list. A second tier of latches is provided, the second tier having multiple second tier latches to serialize access to corresponding allocated sequences of values such that at any point in time, only one of the concurrently executing session processes is granted access to the allocated sequence.

17 Claims, 9 Drawing Sheets

(56) References Cited

U.S. PATENT DOCUMENTS

2012/0011391 A1 1/2012 Callaway et al.
2012/0233496 A1 9/2012 Gil et al.
2012/0303908 A1* 11/2012 Dantzig et al. ............... 711/145
2015/0019803 A1 1/2015 Miller et al.

OTHER PUBLICATIONS

Maurice Herlihy, "Wait-Free Synchronization", ACM Transactions on Programming Languages and Systems, vol. 11, No. 1, Jan. 1991.
Non-final Office Action dated Jan. 28, 2014 for U.S. Appl. No. 13/627,808.
Final Office Action dated May 22, 2014 for U.S. Appl. No. 13/309,300.
Notice of Allowance and Fees Due dated Jun. 6, 2014 for U.S. Appl. No. 13/627,808.
Non-final Office Action dated Aug. 15, 2014 for U.S. Appl. No. 13/309,356.
Non-final Office Action dated Feb. 2, 2015 for U.S. Appl. No. 13/309,356.
Non-final Office Action dated Mar. 16, 2015 for U.S. Appl. No. 13/309,300.
Notice of Allowance and Fee(s) Due dated Jun. 24, 2015 for U.S. Appl. No. 13/309,356.

* cited by examiner

REDUCING SEQUENCE CACHE LATCH CONTENTION IN A DATABASE SYSTEM

RELATED APPLICATIONS

The present application is related to co-pending U.S. patent application Ser. No. 13/309,356, entitled "GENERATING AN ORDERED SEQUENCE IN A DATABASE SYSTEM USING MULTIPLE INTERLEAVED CACHES" and co-pending U.S. patent application Ser. No. 13/309,300, entitled "FAILOVER AND RESUME WHEN USING ORDERED SEQUENCES IN A MULTI-INSTANCE DATABASE ENVIRONMENT", both filed on even date herewith, which are both hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of computer databases and more particularly to techniques for reducing sequence cache latch contention in a computer database system.

BACKGROUND

Some embodiments of the present disclosure are directed to an improved approach for reducing sequence cache latch contention in a database system. More particularly, disclosed herein are a method and system for reducing sequence cache latch contention in a database system having a primary database and a standby database.
Overview of Latch Contention In a modern database system for processing transactions (e.g., commercial transactions such as purchase orders, debits, credits, etc.) many users can use the system at the same time, and many users may have the same sorts of operations to perform. For example, if a user, say User A, desires to process a batch of purchase orders, he or she might want to assign each one of those purchase orders in the batch a unique number. And, it might be desired to assign those purchase orders a unique number within a contiguous sequence (e.g., PO-0001, PO-0002, PO-0003, etc.).

One technique is to assign a large range of contiguous numbers for all users to access and 'check-out' a contiguous sequence. For example, if User A desired to process a batch of, say 20 purchase orders, he or she might request a sequence comprising 20 contiguous numbers (e.g., 0001, 0002, 0003, . . . 0020). However a different user, say User B, might at the same time also desire to process a batch of purchase orders, and could at the same time request a sequence comprising 20 contiguous numbers. One legacy technique for insuring that User A and User B do not receive the same sequence comprising 20 contiguous numbers is to enforce requests to be serialized. There are various techniques for serialization of requests, often involving serialization of requests using a flag or latch (or any implementation of a semaphore). In such as case using a flag or latch, a first user (say User A) is granted access to the list of contiguous numbers, while any next users must wait. Then the first user is given the requested sequence (in this example, numbers 0001-0020), and the next waiting user's request is then processed. Given that the first user's request was satisfied (thus, the next available number would be 0021) the second waiting user's request (e.g., a sequence of 20 contiguous numbers) can be satisfied by returning the sequence 0021, 0022, 0023 through 0040.

While use of the aforementioned flag or "sequence latch" is effective for serialization, in the case that there are a large number of users, there can be many users waiting for their turn to have their request satisfied, and the users can become 'backed up' as they contend for access to the sequence latch. In the case of modern database systems for processing a large number of transactions (e.g., transactions that need sequence numbers), the waiting time can become as large a portion of time as the processing time. In fact, as the number of concurrent users increases, and, as the number of requests for sequences increases, the portion of time spent in waiting can be larger than the remaining time needed to process the transaction.

Therefore, there is a need for an improved approach for implementing reducing sequence cache latch contention in a database system.

SUMMARY

The present disclosure provides an improved method, system, and computer program product suited to address the aforementioned issues with legacy approaches. More specifically, the present disclosure in some embodiments provides a detailed description of techniques used in methods, systems, and computer program products for reducing sequence cache latch contention in a database system.

In a database system having a plurality of concurrently executing session processes, the method according to some embodiments commences by establishing a master list of sequences, the master list comprising a plurality of sequence objects which in turn define a sequence of values used for numbering and other identification within the database system. To reduce sequence cache latch access contention, multiple tiers of latches are provided. Methods of the system provide a first tier having a first tier "global" latch to serialize access to the master list such that at any point in time, only one of the concurrently executing session processes is granted access to the master list, from which master list are allocated sequences on demand. A second tier of latches is provided, the second tier having multiple second tier latches to serialize access to corresponding allocated sequences of values such that at any point in time, only one of the concurrently executing session processes is granted access to the allocated sequence. The multiple tiers serve to reduce the likelihood of contention to the first tier latch.

Further details of aspects, objects, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Some embodiments of the present disclosure are directed to an improved approach for implementing reducing sequence cache latch contention in a database system. More particularly, disclosed herein are environments, methods, and systems for reducing sequence cache latch contention in a database system.

Use of a flag or "sequence latch" is effective for serialization of requests for sequences, however, in the case that there are a large number of users, there can be many users waiting for their turn to have their requests satisfied, and the users can become 'backed up' as they contend for access to the sequence latch. In the case of modern database systems for processing a large number of transactions (e.g., transactions that need a sequence numbers), the waiting time can become as large a portion of time as the processing time. In fact, as the number of concurrent users increases, and, as the number of requests for sequences increases, the portion of time spent in waiting can be larger than the remaining time needed to process the transaction.

One approach to ameliorate the undesirable aspects of time spent in waiting is to pre-allocate multiple blocks of sequences, and define multiple separate latches, each of which separate latch serves to serialize access to its corresponding blocks of sequences. This is somewhat analogous to having multiple "slave" queues instead of having only one "master" queue. To guarantee uniqueness of the sequences still demands access to the master queue, however there is likely to be less waiting in such a master/slave configuration as compared to having only one master queue.

Placing further demands on an appropriate architecture to address the aspect of waiting for serialized access to receive a sequence is that a sequence can be shared across multiple database instances. That is, a database instance can have many sessions (even several thousands of instances, or more), depending on the configuration. Sessions using the same sequence within the same database instance can share the same cached sequence values.

Architecture Overview

Figure 1A:
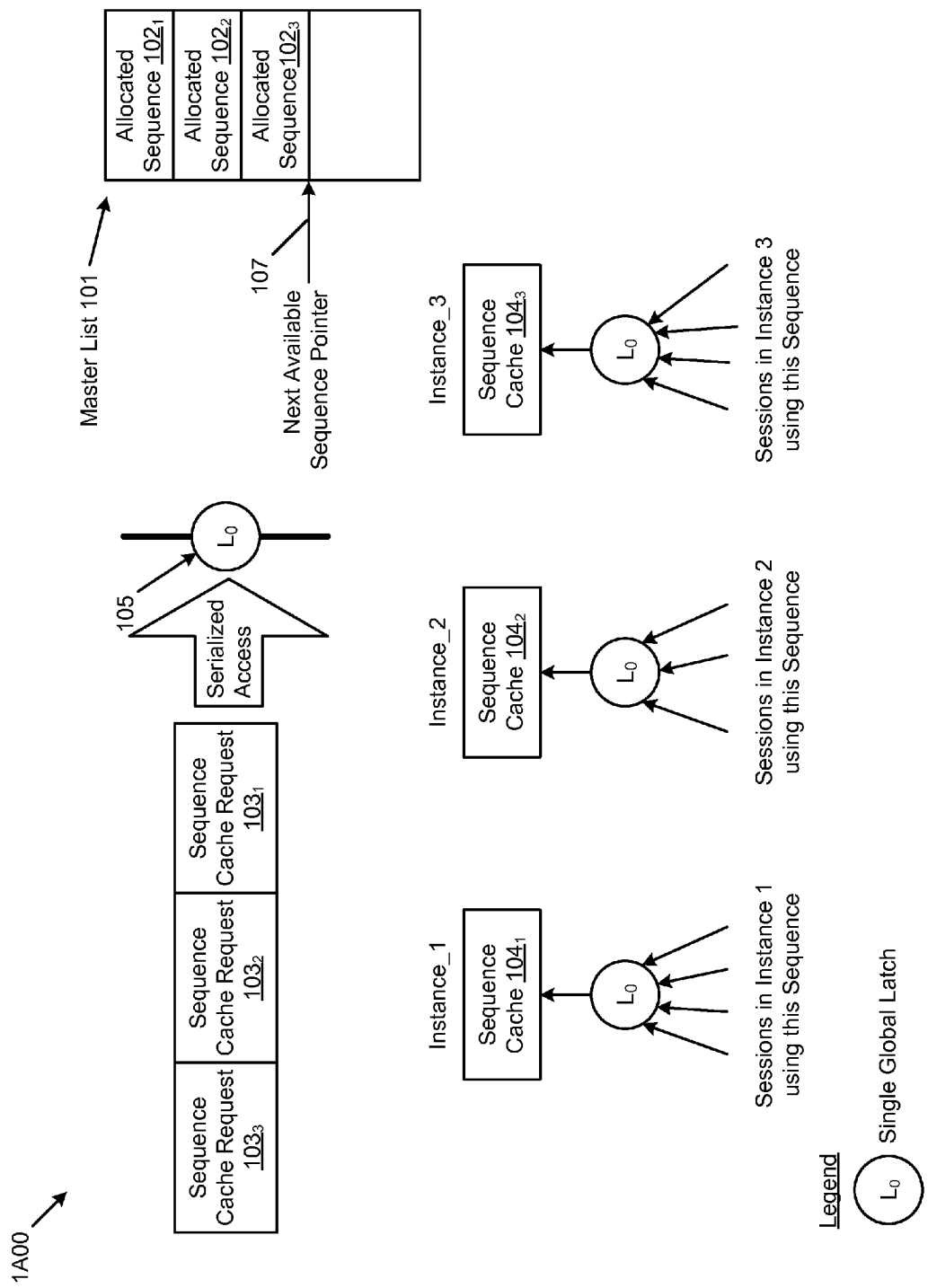
FIG. 1A is a diagrammatic representation of a system showing latch contention in a database system, according to some embodiments.

FIG. 1A is a diagrammatic representation of a system showing latch contention in a database system. As an option, the present system 1A00 may be implemented in the context of the architecture and functionality of the embodiments described herein. Also, the system 1A00 or any operation therein may be carried out in any desired environment.

As shown, a plurality of database instances (e.g., Instance_1, Instance_2, Instance_3, etc.) can each issue requests for a sequence (e.g., sequence cache request $103_1$, sequence cache request $103_2$, etc.), and, as shown, the requests are queued for access to a master list, in which master list any number of allocated sequences can be recorded (e.g., allocated sequence $102_1$, allocated sequence $102_2$, etc.). Such a master list, or variants can be established during code development time, or such a master list can be established dynamically when an instance of a database is defined.

Within a set of database instances, access to an allocated sequence 102 is granted only via the single global latch 105 (shown as $L_0$), and thus, requests are handled serially (though not necessarily in any particular order). Also shown in FIG. 1A is a next available sequence pointer 107, pointing a location in master list 101, which location refers to the next unallocated sequence number in the master list 101. Access to a next available sequence pointer, as well as to the next unallocated sequence, is granted only via the single global latch $L_0$.

In this embodiment, multiple sequences can be allocated, and a given allocated sequence can be stored in a sequence cache (e.g., sequence cache $104_1$, sequence cache $104_2$, sequence cache $104_3$, etc.), the sequence cache being provided in a segment (or in multiple segments) comprised of volatile or non-volatile memory locations. Requests for an individual sequence values (e.g., 0001, 0002, etc.) can be made by any session in an instance, and such requests are serialized by use of the single global latch. While the architecture of system 1A00 serves to serialize access to the next available sequence pointer 107 (which records a "high watermark"), as well as to the next unallocated sequence, such serialized access is still granted only via the single global latch $L_0$, which can result in many requests being queued up and waiting. Additional techniques (see below) can be implemented to reduce waiting time associated with serialization provided by only a single global latch.

In fact, for handling a wide range of applications, and for providing flexibility in implementations, a data structure pertaining to a sequence cache request can be defined. One aspect of such a data structure serves to support caching. For example, if a sequence caching mechanism is desired, a sequence cache request 103 can include a data structure setting a CACHE option value to ON. The use of a sequence cache 104 serves to avoid updating the high watermark and other attributes of a sequence in the master list 101 each and every time a new sequence value is requested. Yet, since it is possible that multiple sessions (e.g., thousands of sessions) might request a new sequence value at any time, and since (using only single master latch techniques), any accesses (e.g., accesses for a new sequence request) need to be serialized through the single master latch, such requests remain potentially expensive due to potentially long waiting times. More specifically, serialized access is expensive at least since when a first session is accessing (e.g., accessing for a new sequence request), the other sessions might be blocked from their accesses. Moreover, certain accesses (e.g., accesses to update a master list, updates to a high watermark value, updates to other attributes of a sequence in the master list) can often require many tens of thousands (or more) of machine instructions, such accesses are thus considered expensive.

In this embodiment, the single global latch is used to serialize and safeguard access to the master list in the presence of a database system having multiple concurrently executing sessions. This situation is exacerbated in systems where not only the sequence dictionary, but also the cached sequence values across all the instances (e.g., accessible to all the sessions) are shared. In legacy situations, the use of single global latch across all instances and all sessions, the database operations (and applications that rely on such database operations) suffer a high penalty when contending for the single global latch needed to retrieve a next sequence, or to update a sequence cache.

Still further exacerbating the aforementioned expense, recent trends and advances in computing (e.g., hyper-threading techniques) and advances in server hardware (e.g., a server having up to hundreds of processors comprised of multiple CPU cores) make it possible that hundreds or even many thousands of sessions can request access for sequences at the same time. This problem makes the single global latch contention problem a severe problem in terms of the database performance. Moreover, the aforementioned technologies do not have the capabilities to perform reducing sequence cache latch contention in a database system having a primary database and a standby database. One way to reduce the expense of serialization is to partition the master list into multiple sequence caches and provide a separate "slave" latch for each sequence cache. The slave latches can then be used to serialize on smaller sized sequence caches while retaining the sense of a master latch that serves to serialize access to the shared aspects of sequences.

Figure 1B:
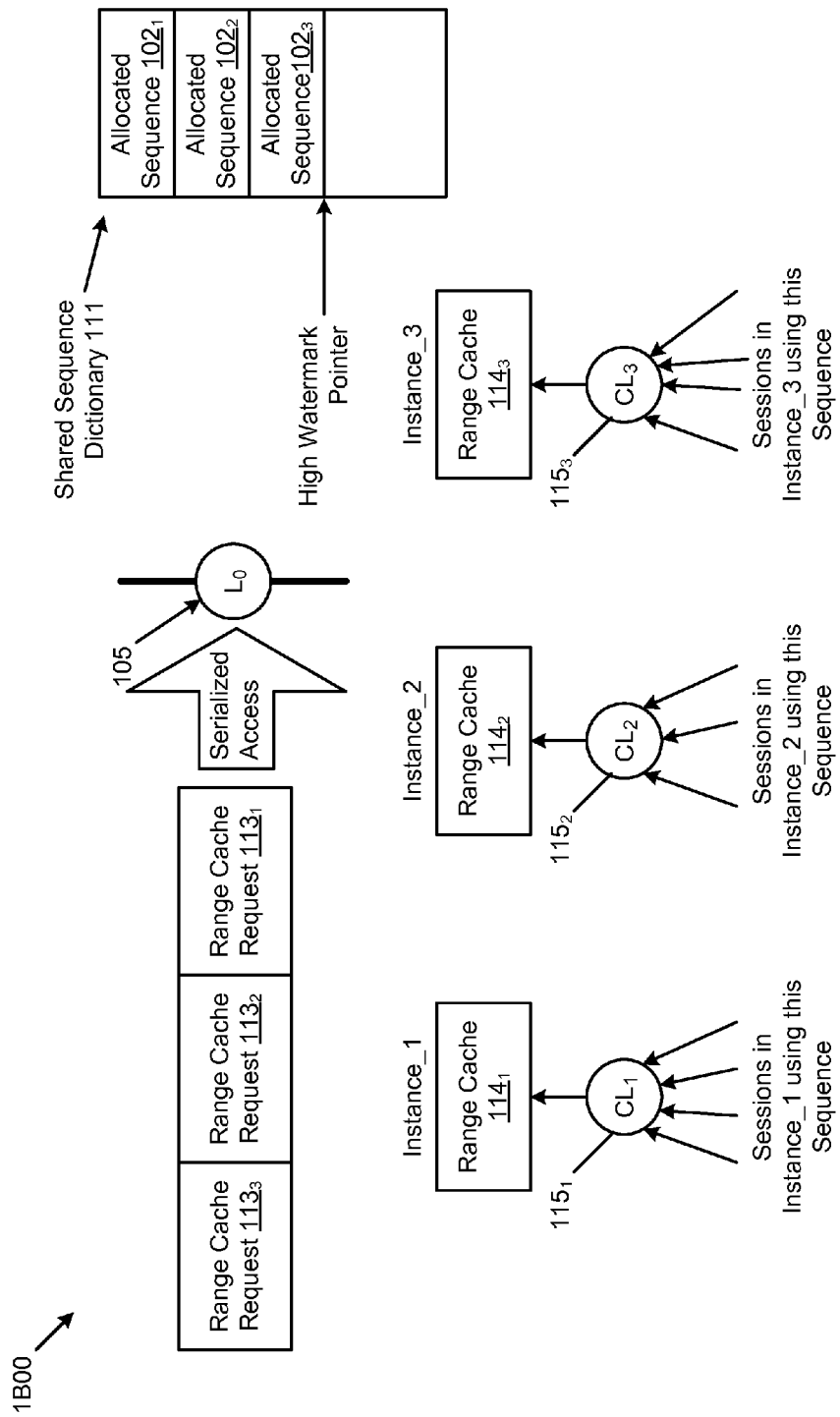
FIG. 1B is a diagrammatic representation of a system for reducing sequence cache latch contention in a database system using slave latches, according to some embodiments.

FIG. 1B is a diagrammatic representation of a system and method for reducing sequence cache latch contention in a database system using slave latches. As an option, the present system 1B00 may be implemented in the context of the architecture and functionality of the embodiments described herein. Also, the system 1B00 or any operation therein may be carried out in any desired environment.

The technique of FIG. 1B shows one way to reduce the expense of serialization is by partitioning the master list into multiple range caches and by providing a separate "slave" latch for each range cache. Each instance (e.g., Instance__1, Instance__2, etc.) can have an associated range cache 114, and access to each range cache is via a corresponding instance child latch 115 (e.g., child latch $CL_0$, $CL_1$, $CL_2$, etc., as shown). Additionally, the aforementioned master list 101 can be recast into a data structure to serve as a shared sequence dictionary 111, which sequence dictionary can store many attributes of sequences.

Indeed, there are many attributes of sequences, and of a shared sequence dictionary 111 and the high watermark (HWM) and/or a high watermark pointer is but one particular attribute of a sequence dictionary that is used to indicate the then current highest possible assigned sequence value. A HWM or its reference via a high watermark pointer can point to the next available sequence value. Or, a HWM or its reference via a high watermark pointer can point to the highest allocated sequence (e.g., allocated sequence $102_3$) plus an increment unit (e.g., if the sequence allocation regime calls for a quantized or incremental allocation). The high watermark pointer can be stored in the shared sequence dictionary 111, or the high watermark pointer can be stored in any storage location. The HWM is updated when a new (e.g., sequentially next) set of sequence values for the give sequence is allocated (e.g., as an effect of processing a range cache request 113).

As aforementioned, it is possible that an instance (e.g., Instance__1, Instance__2) within a database system can comprise hundreds or even many thousands of sessions, and any session at any point in time may need to access to allocated sequence (e.g., within a range cache) in order to satisfy a sequence value request. Accordingly, the embodiment of FIG. 1B can be still further extended to include a latch for each range cache.

Figure 1C:
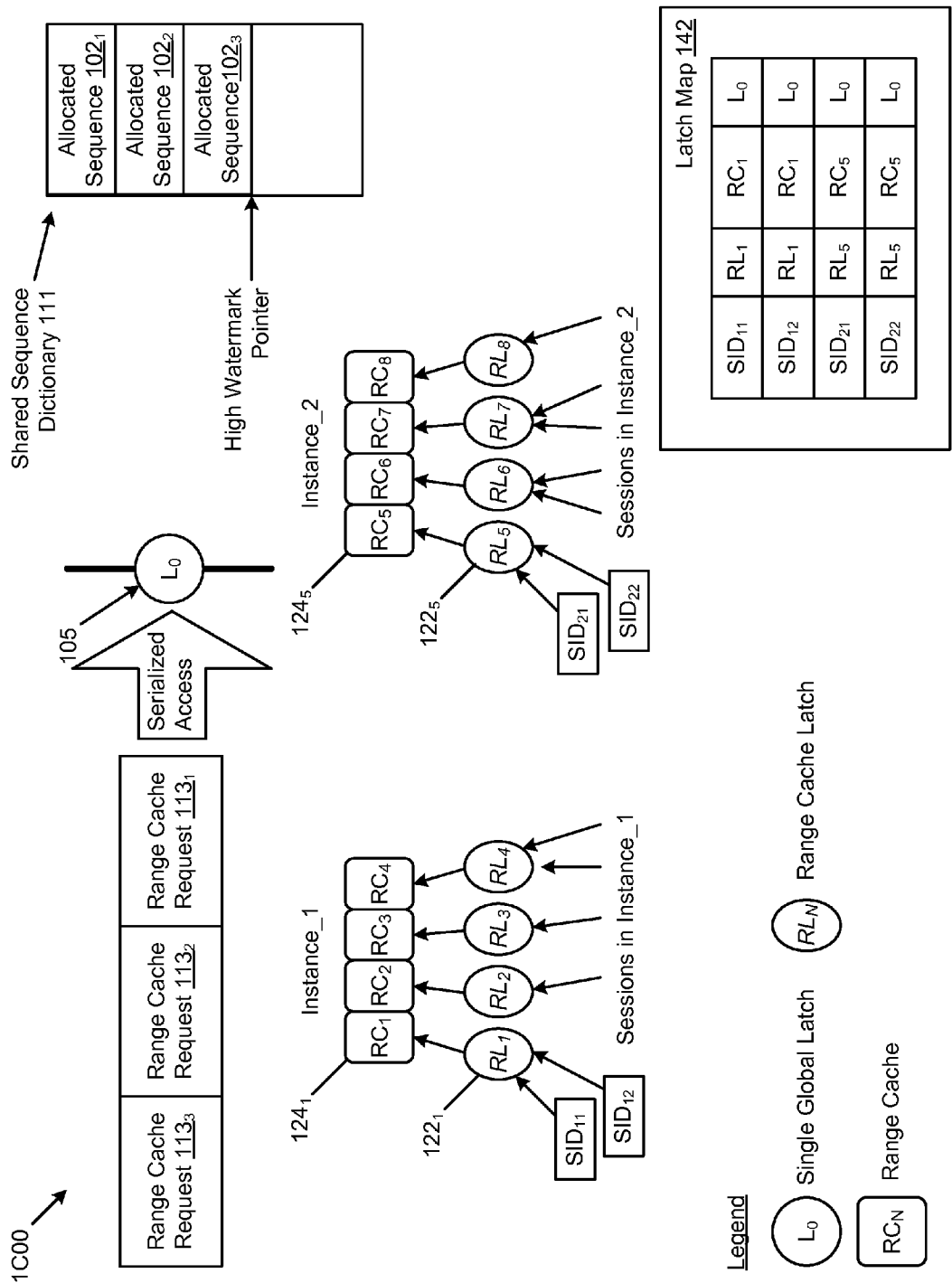
FIG. 1C is a diagrammatic representation of a system for reducing sequence cache latch contention in a database system using range cache latches, according to some embodiments.

FIG. 1C is a diagrammatic representation of a system and method for reducing sequence cache latch contention in a database system using range cache latches. As an option, the present system 1C00 may be implemented in the context of the architecture and functionality of the embodiments described herein. Also, the system 1C00 or any operation therein may be carried out in any desired environment.

Within the technique using range caches, exemplary embodiments split the range held by a particular database instance into multiple consecutive non-overlapping range caches (RC), each of which is guarded by a dedicated child latch. In the system 1C00, a particular range cache 124 (e.g., $RC_1$, $RC_2$, etc.) is guarded by a particular range cache latch 122 (e.g., $RL_1$, $RL_2$, etc.). A newly allocated range cache can be requested at any time by any session.

In one embodiment, a relationship is established between a particular range cache latch 122 to a given session (e.g., a thread in a session, or a process) based on the process ID or the CPU ID to which that given session is associated. Thus, a request for a newly allocated range cache is mapped to a newly allocated range cache, which in turn is guarded by a newly allocated range cache latch. A latch map 142 is provided to relate a session process (e.g., process $SID_{11}$, $SID_{12}$, etc.) to a particular range cache latch (e.g., $RL_1$, $RL_2$, etc.) and to its corresponding range cache (e.g., $RC_1$, $RC_2$, etc.). Optionally, the latch map 142 also relates a given session to the single global latch 105 ($L_0$, as indicated).

Of course, there are many situations that can precipitate a request for a newly allocated range cache. For example, when all of the sequence numbers in the given range cache are used up (e.g., after a series of sequence value requests), a newly allocated range cache can be requested. In another situation involving multiple range caches in an instance, it is possible that a particular sequence value request originating from a session within an instance, as shown, can be routed to other range caches. As a specific example, if a session requested a sequence number from range cache $RC_1$, but all of the sequence numbers in range cache $RC_1$ had been previously used up (e.g., by previous requests), then the request can be directed to other range caches (e.g., $RC_2$, $RC_3$, etc.) until all sequence numbers in all of the range caches are used up, at which time the shared sequence dictionary is accessed, a new range cache is allocated, and the HWM of the shared sequence dictionary is bumped up. This results in a new set of range cache values to be assigned, which newly-assigned range cache is guarded by the newly allocated range cache latch. It is possible that multiple sessions (e.g., multiple sessions within the same instance, or multiple sessions across multiple instances) can concurrently request access to the shared sequence dictionary, and such access is guarded by the single global latch $L_0$. A possible operation enumeration is shown in Table 1:

TABLE 1

Possible Operation Enumeration

| Operation Phase | Operation Description |
| --- | --- |
| Initialization | Based on the sequence cache size and the number of CPUs, the number of range caches (RCs) is determined to optimize the performance. |
| Request | When a session process requests a new sequence number value, based on its process |

TABLE 1-continued

Possible Operation Enumeration

| Operation Phase | Operation Description |
| --- | --- |
|  | ID or CPU ID with which it is associated, the request is mapped to a given range cache. |
| Map | In order to get access to a requested range cache, the session accesses the corresponding child latch using a latch map 142 |
| Return Value | If there are sequence values to be given out for the given range cache, the request is satisfied by returning a sequence value to the requestor. |
| Initially Unsatisfied | If the sequence values in the requested range cache are all used up, the request is routed to other range caches. In order to request a sequence value from another range cache, the corresponding child latch is accessed to ensure serialization. |
| Request Newly Allocated Range Cache from Shared Sequence Dictionary | When all the range caches are used up, bump up the HWM (high watermark) in the sequence dictionary table entry after the new set of cached sequence values are assigned. |

Figure 2:
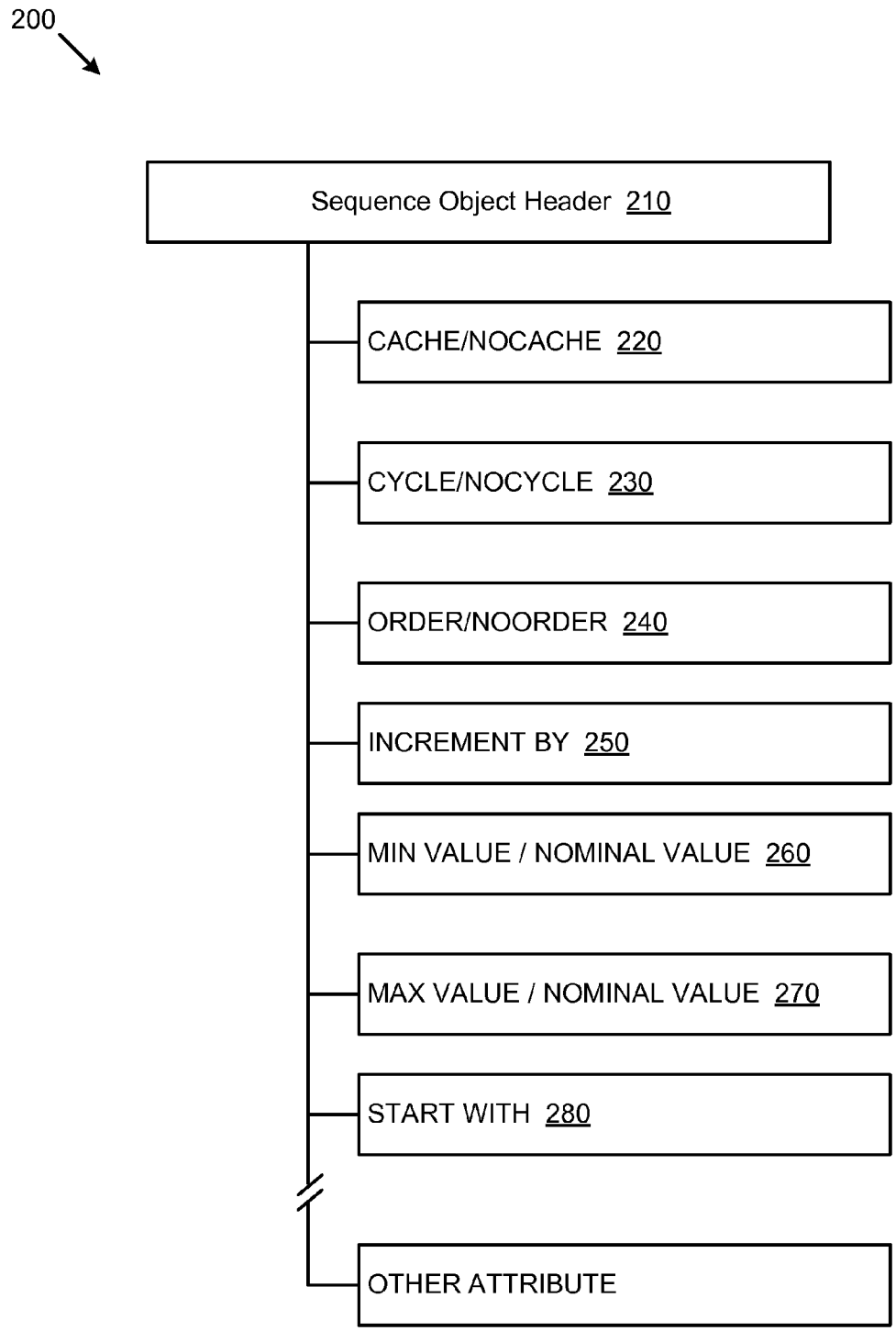
FIG. 2 is a diagram of a sequence object for reducing sequence cache latch contention in a database system, according to some embodiments.

FIG. 2 is a diagram of a sequence object for reducing sequence cache latch contention in a database system. As an option, the present sequence object 200 may be implemented in the context of the architecture and functionality of the embodiments described herein. Also, the sequence object 200 or any aspect therein may be implemented in any desired environment.

As used herein, a "sequence" is a user created database object that can be shared by multiple users to generate unique identifiers (e.g., integers). As shown, the sequence object has attributes as in Table 2:

TABLE 2

| Attributes | |
| --- | --- |
| Data Element | Description |
| Sequence Object Header 210 | Metadata pertaining to the object and its constituent components. Can apply to any one or more instances of the object. |
| CACHE/NOCACHE 220 | Boolean Flag: Specifies if the instance of the object is cached (or not). |
| CYCLE/NOCYCLE 230 | Boolean Flag: Specifies if the instance of the object supports recycling (reusing) sequence identifiers (or not). |
| ORDER/NOORDER 240 | Boolean Flag: Specifies if the instance of the object enforces ordering (or not). |
| INCREMENT BY 250 | Boolean Flag: Specifies if the instance of the object enforces algorithmic incrementation (or not). |
| MIN VALUE/NOMINAL VALUE 260 | Value (e.g., integer value): Specifies the minimum value to use in an algorithmic incrementation. |
| MIN VALUE/NOMINAL VALUE 270 | Value (e.g., integer value): Specifies the maximum value to use in an algorithmic incrementation. |
| START WITH 280 | Value (e.g., integer value): Specifies the initial value to use in an algorithmic incrementation. |

The database objects and techniques of the embodiments as shown and described above can be applied to database systems following a "primary" and "standby" database architecture.

Introduction to Primary and Standby Databases

In legacy systems, a standby database was implemented as a physical replica of a primary database system, and the use of a sequence on a standby database was not allowed in such legacy systems. This limitation was due to a variety of challenges present when sharing usage of a sequence between the primary and standby databases. For example, legacy sharing usage of a sequence on the primary database and the read-only standby databases could cause sequence number collisions due to operations being performed that alter sequence bookkeeping in the presence of latency in updating standby databases.

Figure 3:
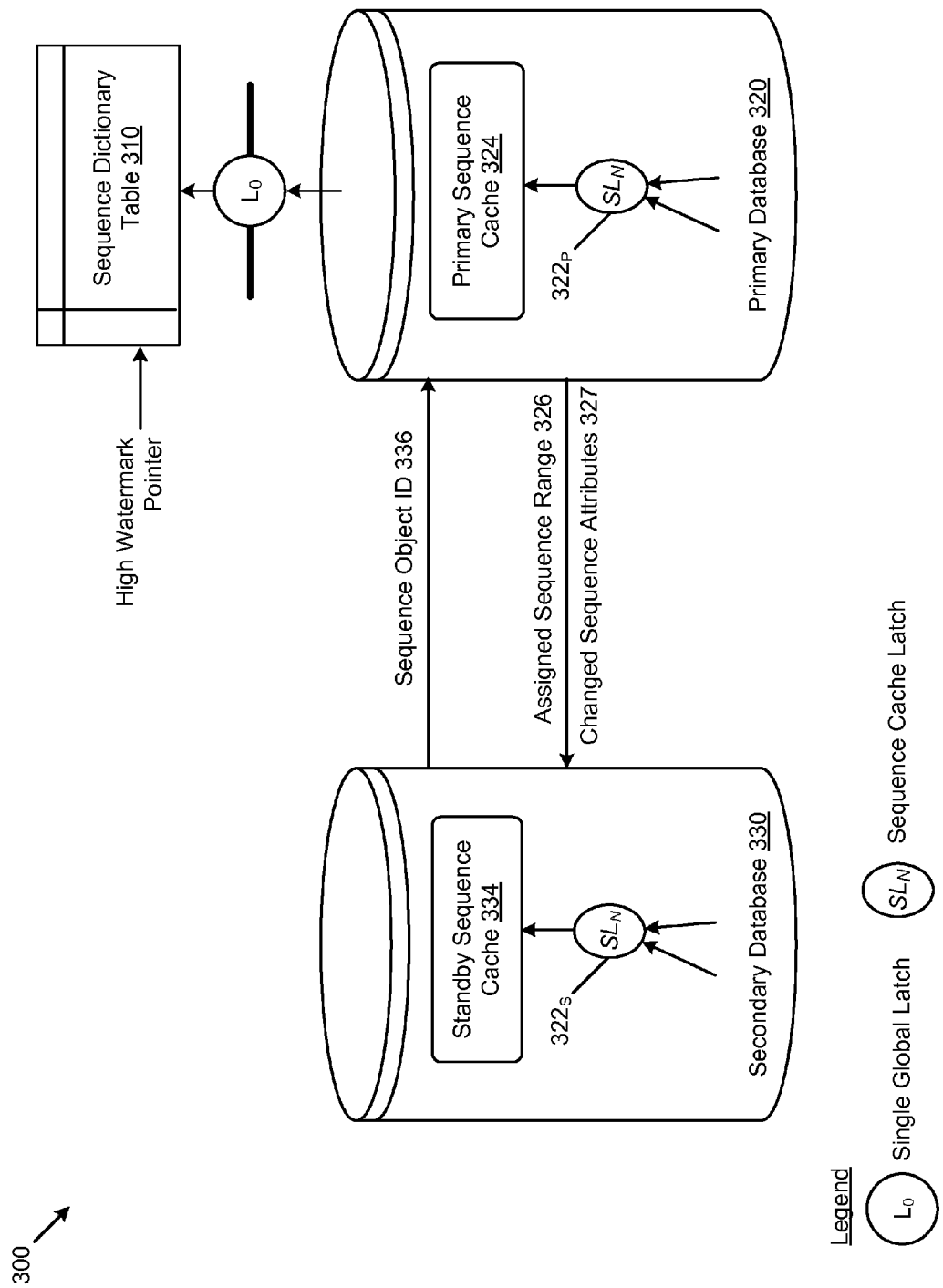
FIG. 3 is a diagram of a system for reducing sequence cache latch contention in a primary/standby database architecture, according to some embodiments.

FIG. 3 is a diagram of a system and method for reducing sequence cache latch contention in a primary/standby database architecture. As an option, the present system 300 may be implemented in the context of the architecture and functionality of the embodiments described herein. Also, the system 300 or any operation therein may be carried out in any desired environment.

The diagram depicts a shared sequence dictionary table for use by the primary and standby databases when using a sequence cache. As detailed below, advances are needed in order to implement efficient shared usage of a sequence among the primary and standby databases without any collision in sequence values. The embodiments of FIG. 3 observe some rules, namely: (1) a sequence can only be created on the primary database and, (2) only the primary database can update the sequence attribute values in the corresponding sequence dictionary table.

In many systems, both the primary database 320 and the standby database 330 operate concurrently, processing transactions asynchronously, and accessing their respective sequence caches (e.g., primary sequence cache 324, standby sequence cache 334) via their respective sequence cache latches (e.g., primary sequence cache latches $322_P$, and standby sequence cache latches $332_S$). During the course of processing transactions, it can occur that an allocated sequence cache (e.g., a standby sequence cache 334) is used up on the standby database 330. As that point in time, the standby database 330 will request a new range of sequence values (e.g., by sending a sequence object ID). Fulfillment of the request serves to refill the standby sequence cache 334. Observing the above rules keeps the primary sequence cache 324 of the primary database synchronized with the standby sequence cache 334 of the standby database. Between the primary database and the standby database, there is only one sequence dictionary table 310.

One possible protocol for synchronizing sequence caches involves maintaining and updating only one instance sequence dictionary table 310 that is shared between the primary database and the standby database. More specifically, the standby database makes requests to the primary database (e.g., via a message protocol or other technique whereby a request is issued to the standby database). Establishing connection information by and between the primary database and the standby database can be accomplished at any point before allocating a sequence. Once the connection between the standby database and the primary database has been established, the standby sends the sequence object ID 336 to the primary database. In response, the primary will allocate a new range of sequence values on behalf of the standby database. Such an operation can be implemented as a callback function that is executed on the primary database. Once a new range of sequence values has been allocated on behalf of the standby database, the primary then sends back the information about the new range of sequence values (e.g., assigned sequence range 326) to the standby database. In some cases the primary may also send the changed sequence attributes 327 if any sequence altering operation had occurred on the primary since the last update of attributes (e.g., via changed sequence attributes 327).

In observing the above rules, it can be seen that a new sequence can only be created on the primary database (though the sequence values can be shared between the standby and the primary databases). Further, it follows that when the sequence values are used up in the primary sequence cache the primary database allocates a new range of sequence values by itself, using the sequence dictionary table, and refills its own primary sequence cache (updating the sequence high watermark information in the sequence dictionary table). On the other hand, if the sequence values in the standby sequence cache are all used up by the standby database, the standby database asks the primary database for a new range of sequence values.

Following the rules and sequences above, any of the disclosed sequence altering situations can occur, yet even when the sequence is being shared among the primary and the standby databases, the rules and sequences serve to guarantee that the sequence cache values allocated for the primary database (possibly on behalf of the standby database) are unique and that the sequence cache attributes are updated with up-to-date attributes of the given sequence at any time when new sequence values are passed to the standby database.

Figure 4:
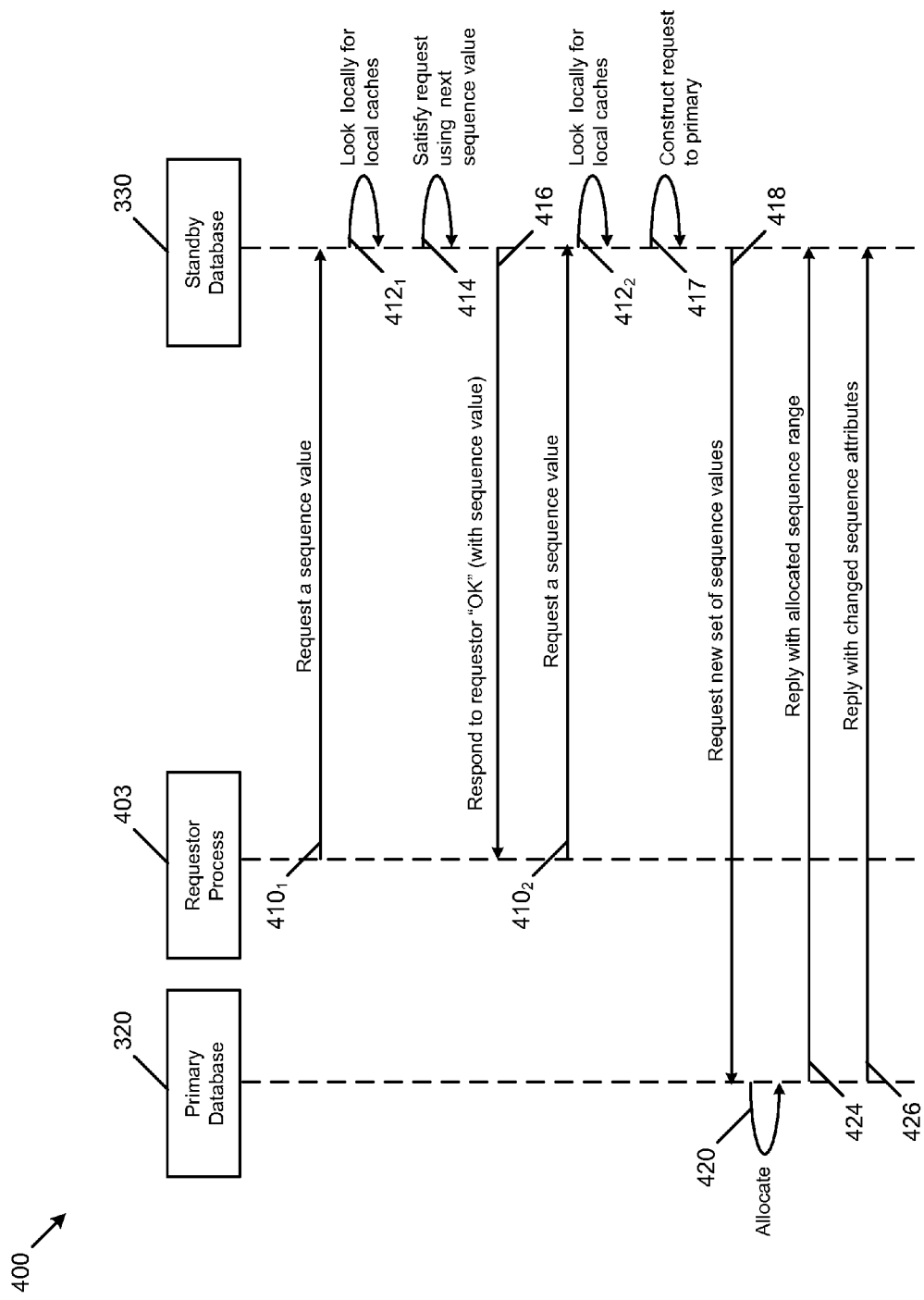
FIG. 4 is a sequence chart of a protocol between a primary database and a standby database for reducing sequence cache latch contention in a database system, according to some embodiments.

FIG. 4 is a sequence chart of a protocol between a primary database and a standby database for reducing sequence cache latch contention in a database system. As an option, the protocol 400 between a primary database and a standby database may be implemented in the context of the architecture and functionality of the embodiments described herein. Also, the protocol 400 or any operation therein may be carried out in any desired environment.

As shown, the protocol 400 depicts messages and operations between a first database (e.g., primary database 320), a process (e.g., requestor process 403), and a second database (e.g., standby database 330). More specifically, the shown protocol indicates messages and operations when a requestor process 403 requests a sequence value $410_1$ (e.g., a sequence number). The standby database performs operations to look locally (e.g., within the standby database) for local caches that could satisfy the request (see operation $412_1$). In the case that a local cache can satisfy the request, then the standby database allocates the next sequence value (see operation 414) and advises the requestor process by sending the sequence value (see message 416).

Of course it is possible that the request comes at a moment in time when there are no more allocatable values in any of the local caches of the standby database (see message $410_2$). The standby database performs operations to look locally (e.g., within the standby database) for local caches that could satisfy the request (see operation $412_2$). However, in the case that a local cache cannot satisfy the request, the standby database constructs a message to send to the primary database (see operation 417). Once constructed, the standby database sends a request to the primary database requesting a new set of sequence values (see message 418). The primary database allocates a new sequence cache (see operation 420) and replies to the standby database with the allocated sequence range (see message 424). At that time, the primary database also sends to the standby database any changed sequence attributes (see message 426).

Figure 5:
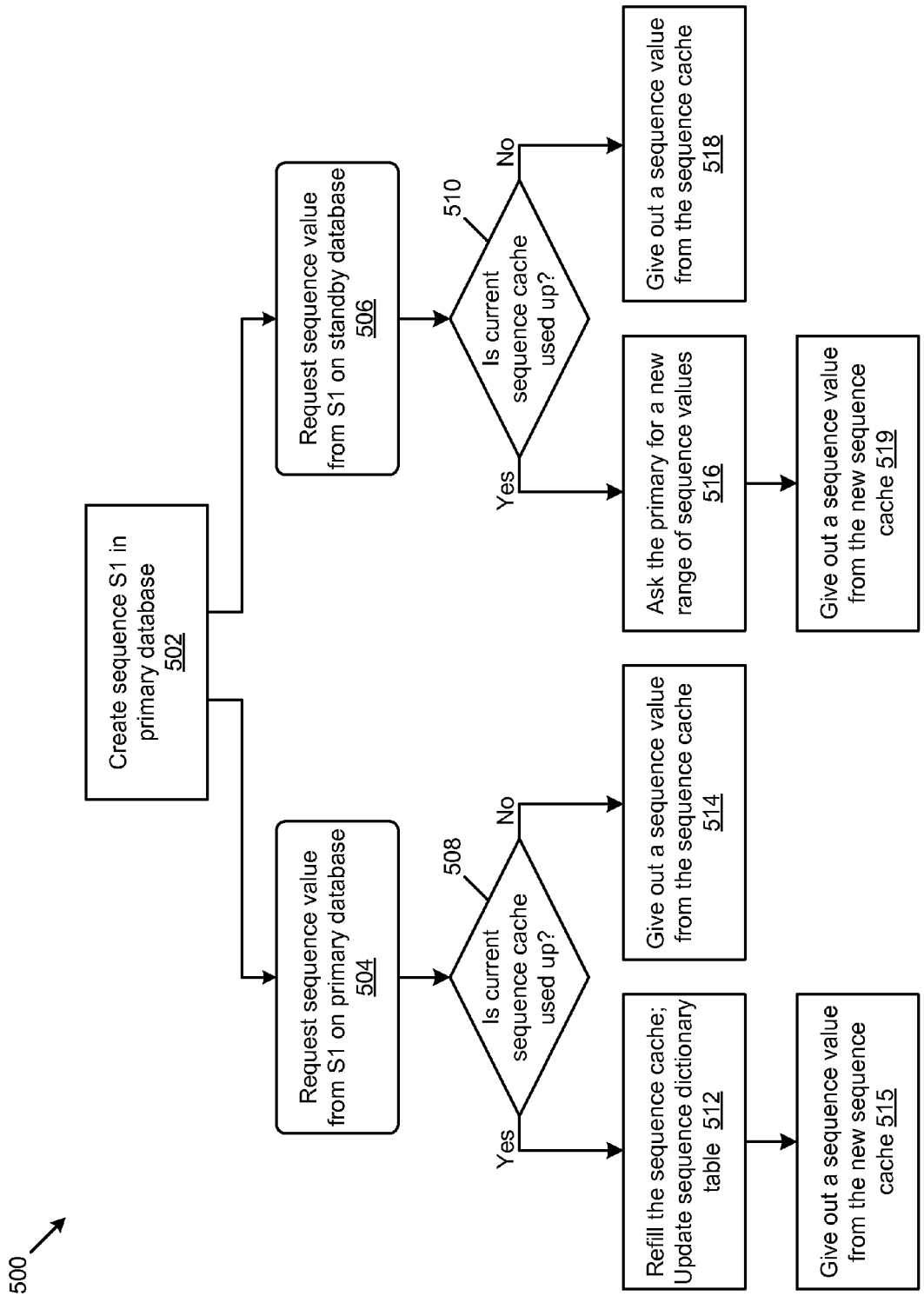
FIG. 5 is a flow chart of a mechanism between a primary database and a standby database for reducing sequence cache latch contention in a database system, according to some embodiments.

FIG. 5 is a flow chart of an approach to implement a method and mechanism between a primary database and a standby database for reducing sequence cache latch contention in a database system. As an option, the present a mechanism 500 between a primary database and a standby database may be implemented in the context of the architecture and functionality of the embodiments described herein. Also, the mechanism 500 or any operation therein may be carried out in any desired environment.

As shown, the mechanism 500 depicts concurrent operations that are executed on a primary database (see operations 502, 504, 512, 514 and 515), and operations that are executed on a standby database (see operations 506, 516, 518, and 519). In operation, the primary database creates a sequence "S1" using the sequence dictionary table 310. Concurrently, or substantially concurrently, operation 504 is performed on the primary database, and operation 506 is performed in the standby database. Now, referring to decision 508, and in the case that there is an available next sequence value in sequence "S1", the requestor receives the next sequence value from the primary sequence cache "S1". Concurrently, or substantially concurrently, operation 506 is performed in the standby database. Referring to decision 510, and in the case that there is an available next sequence value in sequence "S1", the requestor receives the next sequence value from the standby sequence cache "S1".

Of course it is possible that all sequence values in primary sequence cache "S1" have been used up by the session processes, and in such a case, the primary database will refill the primary sequence cache (say, "S2"), and in so doing will update the sequence dictionary table 310. Concurrently, or nearly concurrently, the standby database processes instructions resulting in the decision 510, and, in the case that there is not an available next value in a standby sequence cache, the standby database requests from the primary database a new range of sequence values (see operation 516), and then, using the next sequence value from the new sequence range, gives out the next sequence value from the new standby sequence cache (see operation 519).

Now, following the disclosed techniques above, a wide range of embodiments are possible. Moreover, various embodiments consider the extents of (e.g., number of, and size of) the set of cached sequence values that are organized into a pre-determined number of non-overlapping consecutive range caches that are stored in sequence cache segments within a memory. Exemplary algorithms can adaptively configure the number of range caches depending on the size of the sequence cache and the number of CPU cores in the database machine. The configured extents can be determined by one or more formulas that consider the size of an instance of one of the predetermined sequence cache segments, and also considers the number of CPU cores available to session processes.

Based on the process ID or CPU number that a user session (e.g., a session process) is associated with, a child lock map relates a given session to a sequence range cache and its corresponding child lock. In some embodiments, when the sequence values in a range cache to which a user session is mapped are all used up, other unused sequence caches are accessed (using the sequence cache's corresponding child latch) until all the cached sequence values are consumed, at which time a new set of cached sequence values are requested by the master list (after acquiring serialized access via the single global latch).

The foregoing descriptions are merely exemplary embodiments, and other embodiments can be implemented without departing from the scope of the claims.

Additional Embodiments of the Disclosure

Figure 6:
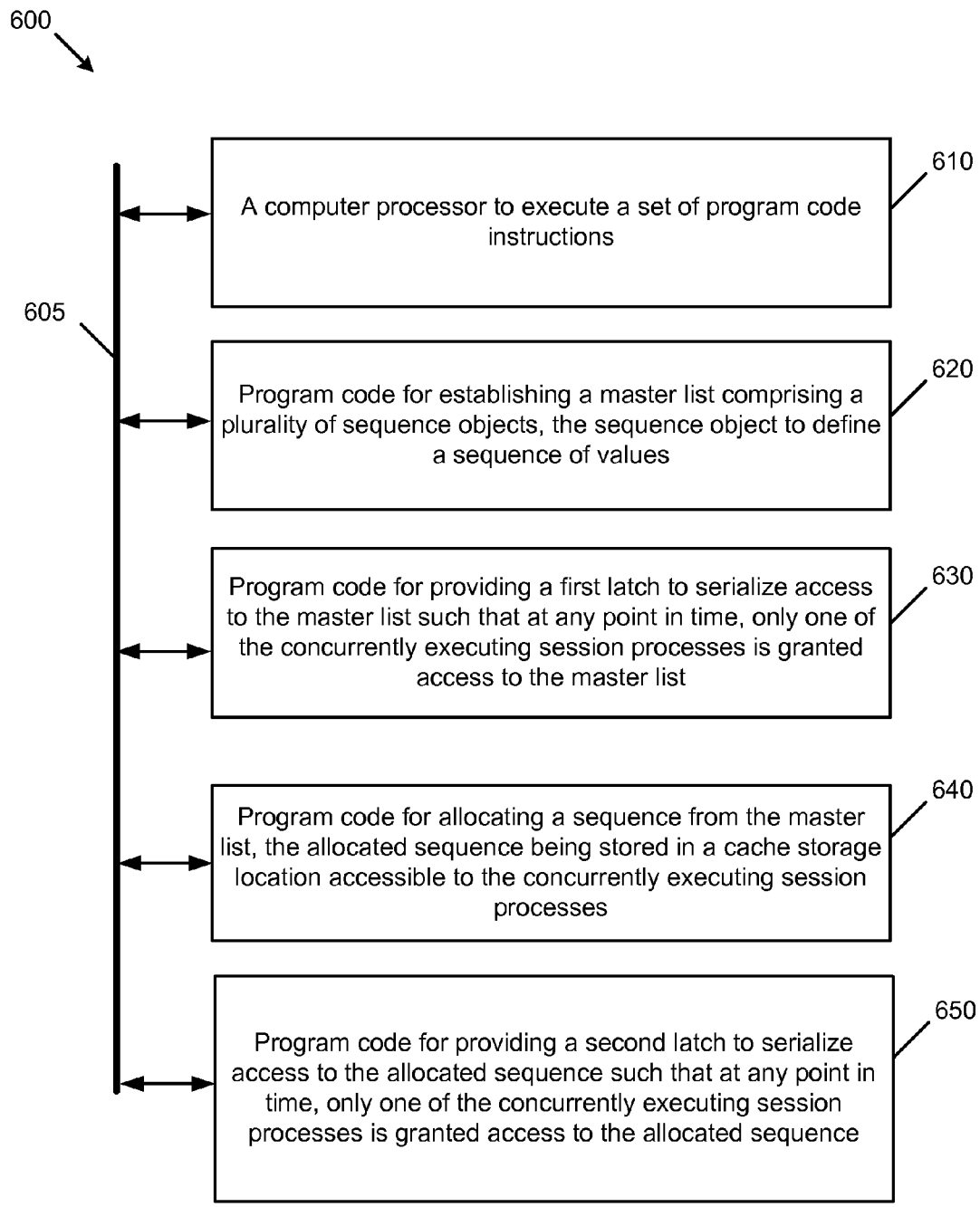
FIG. 6 depicts a block diagram of a system to perform certain functions of a computer system, according to some embodiments.

FIG. 6 depicts a block diagram of a system to perform certain functions of a computer system. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: establishing a master list comprising a plurality of sequence objects, the sequence object to define a sequence of values (see module 620); providing a first latch to serialize access to the master list such that at any point in time, only one of the concurrently executing session processes is granted access to the master list (see module 630); allocating a sequence from the master list, the allocated sequence being stored in a cache storage location accessible to the concurrently executing session processes (see module 640); and providing a second latch to serialize access to the allocated sequence such that at any point in time, only one of the concurrently executing session processes is granted access to the allocated sequence (see module 650).

System Architecture Overview

Figure 7:
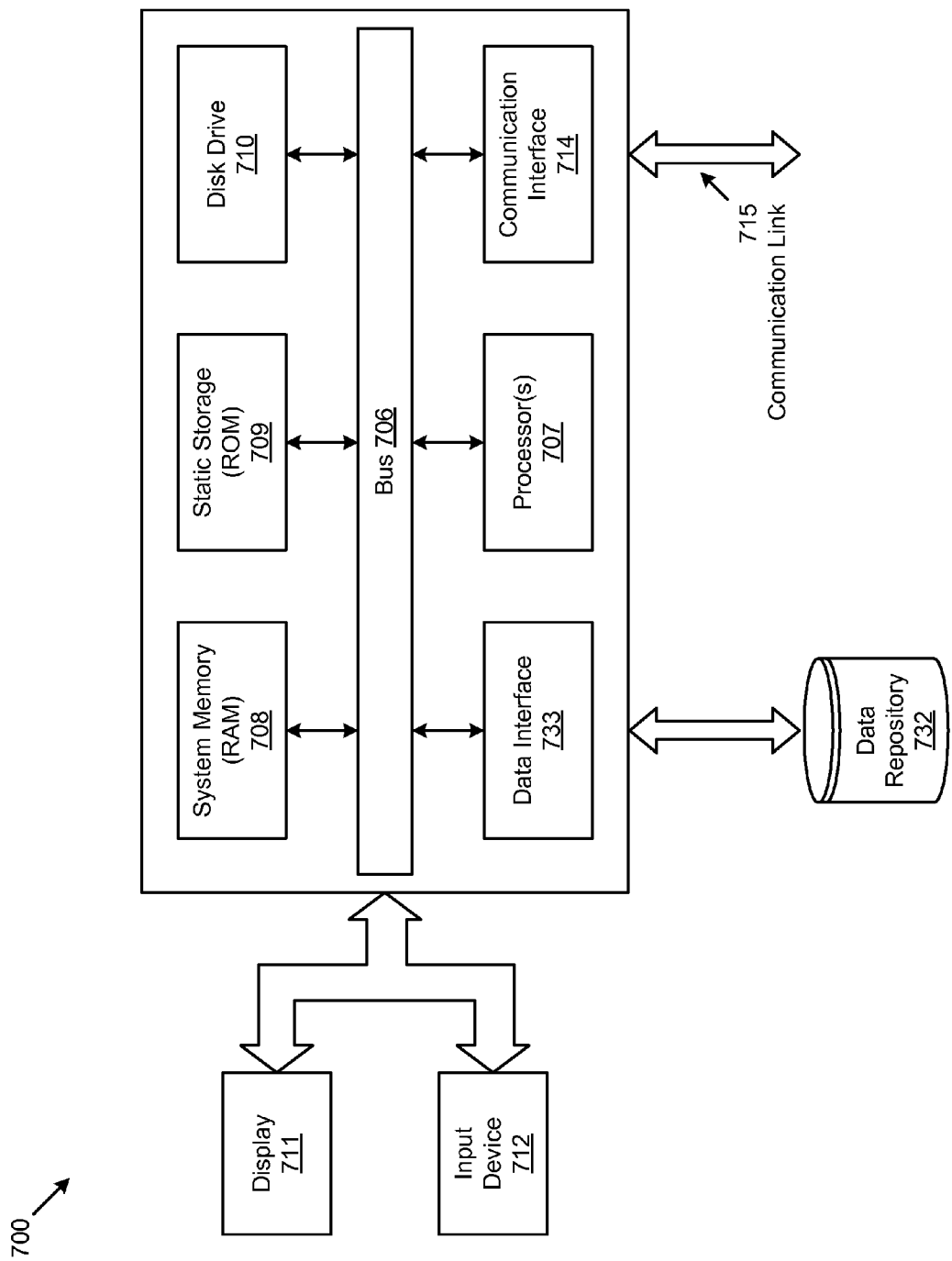
FIG. 7 illustrates a computer system on which an embodiment of the claims can be implemented.

FIG. 7 depicts a block diagram of an instance of a computer system suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device 709 (e.g., ROM), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 732.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device 709 or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to other embodiments of the disclosure, two or more computer systems 700 coupled by a communication link 715 (e.g., LAN, PTSN, or wireless network) may perform the sequence of instructions required to practice the disclosure in coordination with one another.

Computer system 700 may transmit and receive messages, data, and instructions, including program, i.e., application code, through communication link 715 and communication interface 714. Received program code may be executed by processor 707 as it is received, and/or stored in disk drive 710 or other non-volatile storage for later execution. Computer system 700 may communicate through a data interface 733 to a database on an external data repository 732. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for reducing sequence cache latch access contention in a database system having a plurality of concurrently executing session processes on a database instance, the method comprising:

establishing a master list comprising a plurality of sequence objects, the sequence object to define a sequence of values;

providing a first latch to serialize access to the master list such that at any point in time, only one of the concurrently executing session processes is granted access to the master list;

allocating a sequence from the master list to the database instance, the allocated sequence being stored in a cache storage location accessible to the concurrently executing session processes on the database instance;

providing a plurality of child latches corresponding to a plurality of segments of the allocated sequence, wherein the plurality of child latches are used to serialize access to the corresponding plurality of segments, such that at any point in time, only one of the concurrently executing session processes is granted access to a particular segment of the plurality of segments; and wherein a number of the plurality of child latches is determined by using at least a cache size and a number of processing entities available to the concurrently executing session processes.

2. The method of claim 1, further comprising updating a next available sequence pointer the master list.

3. The method of claim 1, wherein first allocated sequence comprises a first set of values, the first set of values do not comprise any of a second set of values corresponding to a second allocated sequence.

4. The method of claim 1, wherein a single instance of the concurrently executing session processes is associated to a child latch of the plurality of child latches using a child latch map.

5. The method of claim 1, wherein the number of processing entities corresponds to a number of CPU cores.

6. The method of claim 1, wherein the allocating is performed based on a request for a sequence from the master list, and wherein the request being issued by a standby database is satisfied by a primary database based on a message protocol between the standby database and the primary database.

7. A computer system to reducing sequence cache latch contention in a database system, comprising:
 a computer processor to execute a set of program code instructions; and
 a memory to hold the set of program code instructions, in which the set of program code instructions comprises program code to perform,
 establishing a master list comprising a plurality of sequence objects, the sequence object to define a sequence of values;
 providing a first latch to serialize access to the master list such that at any point in time, only one of a concurrently executing session processes is granted access to the master list;
 allocating a sequence from the master list to a database instance, the allocated sequence being stored in a cache storage location accessible to the concurrently executing session processes on the database instance;
 providing a plurality of child latches corresponding to a plurality of segments of the allocated sequence, wherein the plurality of child latches are used to serialize access to the corresponding plurality of segments, such that at any point in time, only one of the concurrently executing session processes is granted access to a particular segment of the plurality of segments; and
 wherein a number of the plurality of child latches is determined by using at least a cache size and a number of processing entities available to the concurrently executing session processes.

8. The computer system of claim 7, in which the set of program code instructions comprises program code to further perform updating a next available sequence pointer the master list.

9. The computer system of claim 7, wherein first allocated sequence comprises a first set of values, the first set of values do not comprise any of a second set of values corresponding to a second allocated sequence.

10. The computer system of claim 7, wherein a single instance of the concurrently executing session processes is associated to a child latch of the plurality of child latches using a child latch map.

11. The computer system of claim 7, wherein the number of processing entities corresponds to a number of CPU cores.

12. The computer system of claim 7, wherein the allocating is performed based on a request for a sequence from the master list, and wherein the request being issued by a standby database is satisfied by a primary database based on a message protocol between the standby database and the primary database.

13. A computer program product embodied in a non-transitory computer readable medium, the non-transitory computer readable medium having stored thereon a sequence of instructions which, when executed by a processor causes the processor to execute a method to implement reducing sequence cache latch contention in a database system, the method comprising:
 establishing a master list comprising a plurality of sequence objects, the sequence object to define a sequence of values;
 providing a first latch to serialize access to the master list such that at any point in time, only one of a concurrently executing session processes is granted access to the master list;
 allocating a sequence from the master list to a database instance, the allocated sequence being stored in a cache storage location accessible to the concurrently executing session processes on the database instance;
 providing a plurality of child latches corresponding to a plurality of segments of the allocated sequence, wherein the plurality of child latches are used to serialize access to the corresponding plurality of segments, such that at any point in time, only one of the concurrently executing session processes is granted access to a particular segment of the plurality of segments; and
 wherein a number of the plurality of child latches is determined by using at least a cache size and a number of processing entities available to the concurrently executing session processes.

14. The computer program product of claim 13, the method further comprising updating a next available sequence pointer the master list.

15. The computer program product of claim 13, wherein first allocated sequence comprises a first set of values, the first set of values do not comprise any of a second set of values corresponding to a second allocated sequence.

16. The computer program product of claim 13, wherein a single instance of the concurrently executing session processes is associated to a child latch of the plurality of child latches using a child latch map.

17. The computer program product of claim 13, wherein the number of processing entities corresponds to a number of CPU cores.

* * * * *